United States Patent
Lee

(10) Patent No.: US 10,417,179 B2
(45) Date of Patent: Sep. 17, 2019

(54) METHOD FOR MANAGING FILES AND APPARATUS USING THE SAME

(71) Applicant: GAEASOFT CO., LTD., Seoul (KR)

(72) Inventor: Doo Hyung Lee, Seoul (KR)

(73) Assignee: GAEASOFT CO., LTD., Seoul (KR)

(*) Notice: Subject to any disclaimer, the term of this patent is extended or adjusted under 35 U.S.C. 154(b) by 0 days.

(21) Appl. No.: 16/180,481

(22) Filed: Nov. 5, 2018

(65) Prior Publication Data

US 2019/0073371 A1  Mar. 7, 2019

Related U.S. Application Data

(63) Continuation of application No. PCT/KR2017/006051, filed on Jun. 9, 2017.

(30) Foreign Application Priority Data

Jun. 10, 2016  (KR) .................. 10-2016-0072754

(51) Int. Cl.
*G06F 17/30* (2006.01)
*G06F 16/11* (2019.01)
(Continued)

(52) U.S. Cl.
CPC ............ *G06F 16/122* (2019.01); *G06F 9/547* (2013.01); *G06F 16/00* (2019.01); *G06F 16/166* (2019.01); *G06F 16/183* (2019.01); *H04L 67/06* (2013.01)

(58) Field of Classification Search
CPC .... G06F 16/122; G06F 16/166; G06F 16/183; G06F 9/547; H04L 67/06
See application file for complete search history.

(56) References Cited

U.S. PATENT DOCUMENTS 6,223,200 B1 * 4/2001 Barnes ................ G06F 16/1774
718/100
6,766,314 B2 * 7/2004 Burnett ............... G06F 21/6218
707/694
(Continued)

FOREIGN PATENT DOCUMENTS

JP  2005-322020 A  11/2005
JP  2011039953 A  2/2011
(Continued)

OTHER PUBLICATIONS

International Search Report and Written Opinion, dated Sep. 27, 2017, for International Application No. PCT/KR2017/006051, 10 pages.
(Continued)

*Primary Examiner* — Jared M Bibbee
(74) *Attorney, Agent, or Firm* — Husch Blackwell LLP

(57) ABSTRACT

A method for managing files is provided. The method includes steps of: a file managing device (a) detecting a system call corresponding to a file access request from a program executed by the device; and (b) performing, by referring to the detected system call and parameters thereof, at least one of (i) execution of a procedure corresponding to the system call and (ii) supporting execution of the procedure corresponding to the system call, based on at least one file management policy; wherein the policy includes a local file naming policy to determine at least one of a file name and a file path among the parameters, by referring to an attribute thereof, which has at least part of a creation date and time, a modification date and time, a type, a name, an owner, a creator, an access privilege, origin information, version, situational information, a keyword and a subtitle.

26 Claims, 8 Drawing Sheets

(51) Int. Cl.
  *G06F 16/00* (2019.01)
  *G06F 16/16* (2019.01)
  *G06F 16/182* (2019.01)
  *G06F 9/54* (2006.01)
  *H04L 29/08* (2006.01)

(56) References Cited

U.S. PATENT DOCUMENTS

| | | | | |
|---|---|---|---|---|
| 7,822,728 | B1* | 10/2010 | Chandler | G06F 16/1774 707/704 |
| 9,503,542 | B1* | 11/2016 | Wang | H04L 67/06 |
| 9,959,280 | B1* | 5/2018 | Whitehead | G06F 16/162 |
| 2005/0251508 | A1* | 11/2005 | Shimizu | H04L 67/1097 |
| 2006/0085482 | A1* | 4/2006 | Trowbridge | G06F 9/445 |
| 2007/0027911 | A1 | 2/2007 | Hakala et al. | |
| 2008/0077633 | A1* | 3/2008 | Kaplan | G06F 16/122 |
| 2008/0307527 | A1* | 12/2008 | Kaczmarski | G06F 16/122 726/24 |
| 2010/0306283 | A1* | 12/2010 | Johnson | G06F 16/125 707/803 |
| 2013/0198474 | A1* | 8/2013 | Shaath | G06F 12/1466 711/163 |
| 2014/0089256 | A1* | 3/2014 | Mardugalliamov | G06F 16/1767 707/609 |

FOREIGN PATENT DOCUMENTS

| | | |
|---|---|---|
| JP | 2012-190311 A | 10/2012 |
| JP | 2014-123343 A | 7/2014 |
| KR | 10-2012-0116295 A | 10/2012 |
| KR | 10-2014-0079552 A | 6/2014 |
| KR | 10-2015-0073136 A | 6/2015 |
| KR | 10-1525984 B1 | 6/2015 |

OTHER PUBLICATIONS

Korean Notice of Allowance, dated Aug. 31, 2017, for Korean Application No. 10-2016-0072754, 2 pages. (With English Machine Translation).

Korean Office Action, dated Mar. 2, 2017, for Korean Application No. 10-2016-0072754, 3 pages. (With English Machine Translation).

Korean Office Action, dated Sep. 30, 2016, for Korean Application No. 10-2016-0072754, 3 pages. (With English Machine Translation).

* cited by examiner

METHOD FOR MANAGING FILES AND APPARATUS USING THE SAME

FIELD OF THE DISCLOSURE

The present disclosure relates to a method for managing files and a device using the same that determines a file name according to a rule and synchronizes a file; and more particularly, to the method and the device using the same, comprising steps of (a) a file managing device, detecting a system call corresponding to a request for access to the file from a program executed in the file managing device; and (b) a file managing device, based on a preset file managing policy, performing at least one of (i) a process executing a procedure corresponding to the system call, and (ii) a process supporting other device to execute a procedure corresponding to the system call by referring to the detected system call and one or more parameters of the system call.

BACKGROUND OF THE DISCLOSURE

As most office works are computerized, most documents generated from the office works are created and circulated as a form of a computerized file. Most operating systems give a file name and a file path to a file to identify these files.

Additionally, much of the computerized office works are created, edited and processed by multiple user groups rather than by one user, and in this case, a file may be shared by transmission over a network or by access allowed for multiple users in a single location of storage.

However, in case each user creates a file which is processed by the multiple user groups and if the file name and the file path for identification of the file is determined arbitrarily by the each user, systematic management of the file may be difficult.

Additionally, as the multiple users may edit and process the file, it is difficult to track and manage contents edited by different users. As the case may be, edited contents of the file may be lost or contradiction may occur in the contents, as different users modify the file simultaneously.

In an endeavor to resolve these problems, e.g., in the Korean Patent Registration No. 10-1525984, a method is disclosed that in case a dialogue window corresponding to saving a file is called upon, a document managing device automatically designates and displays a file name and a storage path for the file to a user, and by receiving a user input, saves the file according to the file name and the storage path thus chosen.

The method mostly utilizes a technique of changing the mode of operation by intercepting a specific point in a written code, in other words, hooking. For example, a hooking method on the Microsoft Windows operating system includes normally registering and using a hook dll in a reserved location of a registry, or forcibly accessing MS Word by changing the content of the Import Address Table (IAT) of the Portable Executable (PE) file into a function of interest.

This assumes in general that it is applicable only when a file saving activity shows a pop-up dialogue window for saving the file, that confirmation of the file name and the storage path is done by the user and that the user group writes the files in a single server (a repository), and this poses limitation of unavailability of a local device that the each user may use beside the server in which the users share their files.

Moreover, this method may cause a deadlock with other application using an identical hooking technique. By referring to FIG. 8, in case the contents of the file (resource 1) is allocated to other application (process 1), e.g., if an address (resource 2) of a file storing function is allocated to an application (process 2) of Korean Patent Registration No. 10-1525984, a system halts from a deadlock occurred at the time of file saving.

In an effort to resolve this problem and to keep a deadlock from happening, controlling methods of a deadlock avoidance by occupying resource in order identical to that of other application, or a deadlock prevention by acquiring privileges (e.g., administrator privileges) higher than that of other application and forcing other application to return resource thereof, are used. However, even these methods are not fundamental solutions, as these do not remove the cause per se that may bring a deadlock.

SUMMARY OF THE DISCLOSURE

It is an object of the present disclosure to solve all the aforementioned problems.

It is another object of the present disclosure to provide a method and a device using the same for managing files operational at a kernel level to acquire a topmost privilege in a structure of an operating system.

It is still another object of the present disclosure to automatically determine a file name and a location of saving without a user's decision by coordination in a user group.

It is still yet another object of the present disclosure to synchronize a file by setting and applying the file name according to one or more preset rules and by transmitting a locally saved file to a server by referring to at least one preset file transmission policy.

In accordance with one aspect of the present disclosure, there is provided a method for managing files, comprising steps of (a) a file managing device, detecting a system call corresponding to a request for access to a file from a program executed in the file managing device; and (b) the file managing device, based on one or more preset file management policy, performing at least one of (i) a process of executing a procedure corresponding to the system call, and (ii) a process of supporting other device to execute a procedure corresponding to the system call, by referring to the detected system call and one or more parameters of the system call, wherein the file management policy includes a local file naming policy, based on one or more attributes of the file, for the file managing device to determine at least one of the file name by which the file is saved or to be saved and a path by which the file is saved or to be saved among the parameters of the detected system call, and wherein the attributes of the file include at least one of a creation date and time, a modification date and time, a file type, a file name, an owner, a creator (a person who created the file), access privileges, origin information, version information, situational information, a keyword and a subtitle.

In accordance with another aspect of the present disclosure, there is provided a file managing device including a communication part and a processor, wherein the processor (i) detects a system call corresponding to a request for access to a file from a program executed in the file managing device and (ii) performs, based on a preset file management policy, at least one of (a) a process executing a procedure corresponding to the system call, and (b) a process supporting other device to execute a procedure corresponding to the system call, by referring to the detected system call and one or more parameters of the system call, wherein the file management policy includes a local file naming policy, based on one or more attributes of the file, for the file managing device to determine at least one of a file name by which the file is saved or to be saved and a path by which the file is saved or to be saved among the parameters of the detected system call, and wherein the attributes of the file include at least one of a creation date and time, a modification date and time, a file type, a file name, an owner, a creator, access privileges, origin information, version information, situational information, a keyword and a subtitle.

BRIEF DESCRIPTION OF THE DRAWINGS

The above and other objects and features of the present disclosure will become apparent from the following description of preferred embodiments given in conjunction with the accompanying drawings, in which.

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
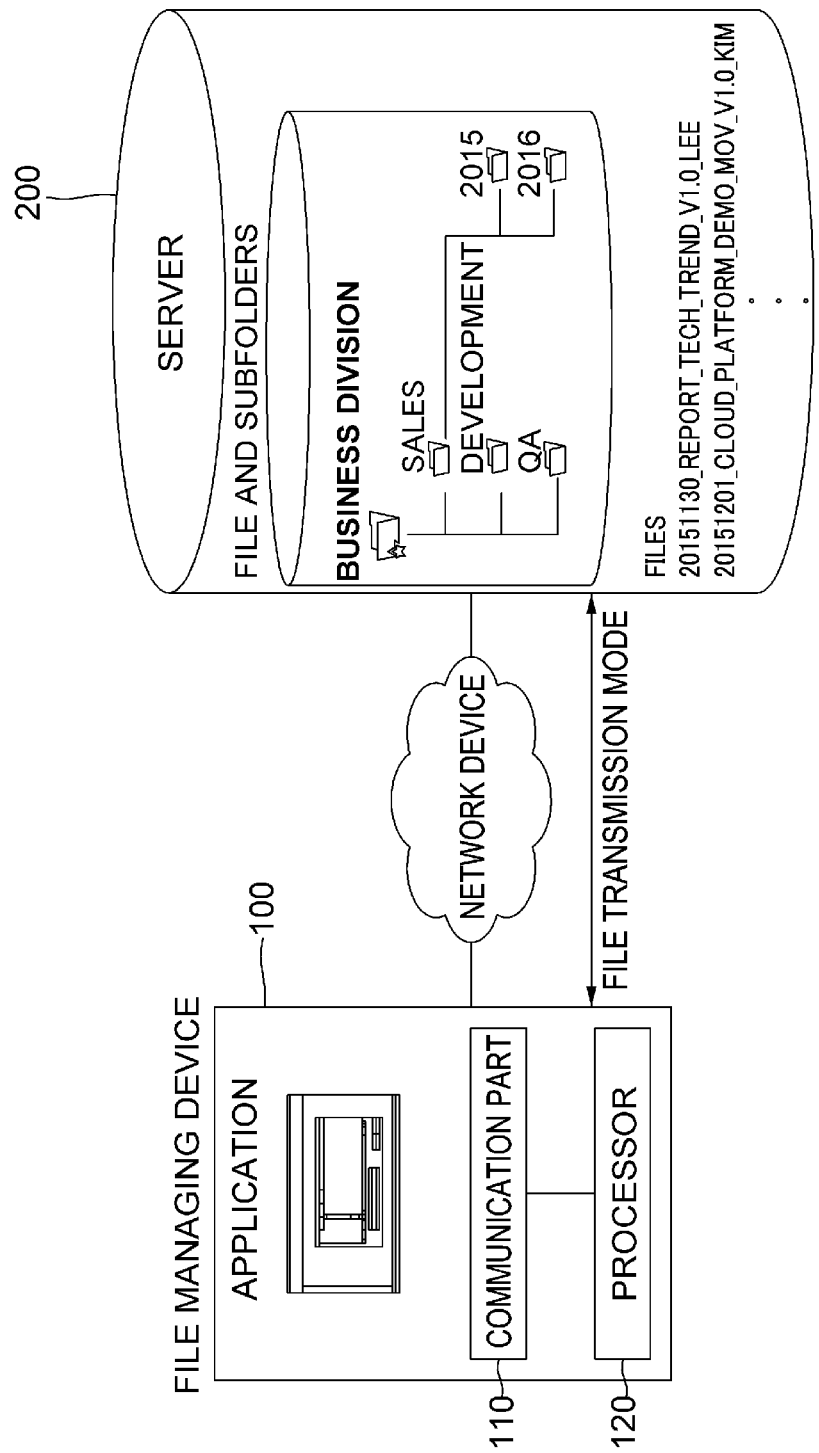
FIG. 1 is a conceptual diagram illustrating an exemplar configuration for applying a method for managing files in accordance with the present disclosure.

In the following detailed description, reference is made to the accompanying drawings that show, by way of illustration, specific embodiments in which the disclosure may be practiced. These embodiments are described in sufficient detail to enable those skilled in the art to practice the disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

To allow those skilled in the art to the present disclosure to be carried out easily, the example embodiments of the present disclosure by referring to attached diagrams will be explained in detail as follows:

In the present specification, "a system call" means an interface used to access a kernel mode as per a request of an application program which is an application that intends to use service provided by a kernel of an operating system.

Generally, regarding a structure of the operating system, the kernel and the application show differences in a privilege level of a processor (e.g., a CPU) or in ability to access hardware. If no distinction is made to a command, without granting privileges, that the application may issue, malicious applications may wreak havoc without limitations. To prevent such an event, there is a privilege granted to the command the processor may issue, and the processor architecture that supports this is called a multiple ring architecture, which is briefly illustrated in FIG. 7.

Figure 7:
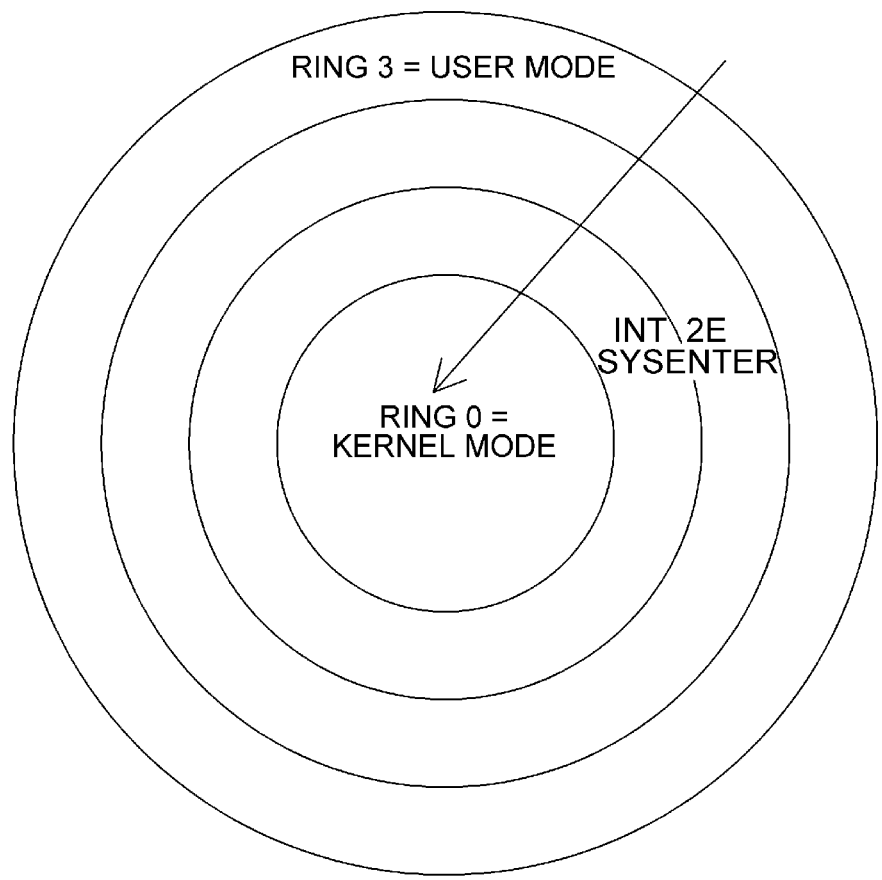
FIG. 7 is a conceptual diagram illustrating privilege levels of a processor to explain a concept of the system call disclosed in the present specification.
Figure 8:
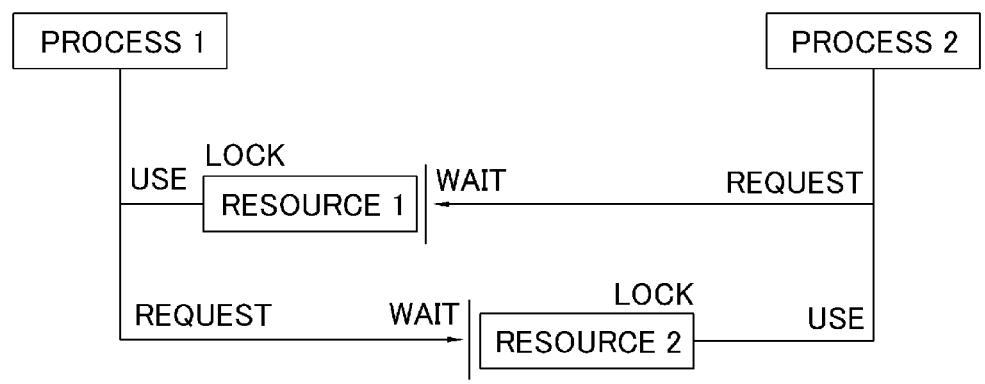
FIG. 8 is a conceptual diagram illustrating a deadlocking process which has been a problem in a conventional hooking method.

By referring to FIG. 7, e.g., a modern series of IBM machines has a total of four layers from ring 0 to ring 3, according to the processor architecture. In principle, ring is a layer on which privilege identical to that of the kernel is given, ring 1 and 2 are layers reserved for use by device drivers as a general rule and ring 3 is a layer for processes generated on execution of a program file compiled into a machine language. The process of such the ring 3 cannot access a core code and data of the operating system. More specifically, the ring 3 mode is a mode by which a program code at a user level is executed, and execution of a specific machine language instruction is impossible. For example, direct access to hardware or access to a virtual memory of the kernel, other important registers or data is prohibited.

Specifically, taking an example of the Windows operating system, the Windows operating system uses ring 0 and ring 3 only. Ring 3 is also known as a user mode, ring is also known as a kernel mode. A system call is the method that an application uses for service rendered by the kernel operating in kernel mode in case the application accesses hardware directly to use a file system or has to depend on the kernel in various situations in user mode, i.e., ring 3. In user mode, the kernel mode can be entered by special commands (int 2e, sysenter). The application may send commands directly to hardware controllers using services of the kernel operating in kernel mode and may even access codes of the operating system or other registers important to a system. Especially, a virtual memory space of the kernel with address number equal or greater than 0x8000000 may be accessed, which cannot be accessed in user mode. For reference, three functions of the system call are as follows:

1. Allowing an application in user mode to use functions of the kernel.

2. Switching from the user mode to the kernel mode if the system call is executed.

3. Continuing work by processing the system call in kernel mode and switching to the user mode.

There are numerous system calls such as these and the most representative types are as follows:

1. Process control
2. File manipulation
3. Device management
4. Information maintenance
5. Communication The system call to be explained mainly in the present specification is about "2. File manipulation" and this is further explained as follows.

Peculiarly, the device drivers of the Windows operate at the level of ring 0. Consequently, the device drivers of the Windows operate in kernel mode and may access a system at a lower level, and may, e.g., detect a system call and change a series of commands executed corresponding to the system call. Hence, the method and the device in accordance with the present disclosure may be implemented in a form of accessing the kernel mode using the device drivers of the Windows, but it may be understood by those skilled in the art who read the detailed explanation below that it is not limited to the operating system or the method.

Further, in the detailed description and claims of the present disclosure, a term 'a process' does not mean a specific task executed in an operating system, and is used solely for the purpose of distinguishing a 'processing' which does not impose a sequence on the order of execution and 'a step' which implicates an order of sequence.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Unless otherwise indicated in the specification or clearly contradicted in the context, an item indicated in the singular includes those in the plural, unless otherwise required in the context. These embodiments will be described in sufficient detail by referring to attached drawings regarding the embodiments of the present disclosure to enable those skilled in the art to practice the disclosure.

FIG. 1 is a conceptual diagram illustrating an exemplar configuration for applying a method for managing files in accordance with the present disclosure.

By referring to FIG. 1, a file managing device 100 links with a server 200 through a wired and wireless connection like network. The file managing device 100 includes a communication part 110 and a processor 120 and this may be a general purpose computing device which may be a wireless network client, a desktop computer, a laptop, a mobile equipment, a mobile phone, a PDA or other terminal device, but it may be understood by those skilled in the art that it is not limited to these. The server 200 may be a device configured to acquire data from the file managing device 100 and to retain a file and may be a device specialized for storage operating in a cloud environment as well as the general purpose computing device.

Below, a file managing method performed by the file managing device 100 in accordance with the present disclosure is described in further detail.

Figure 2:
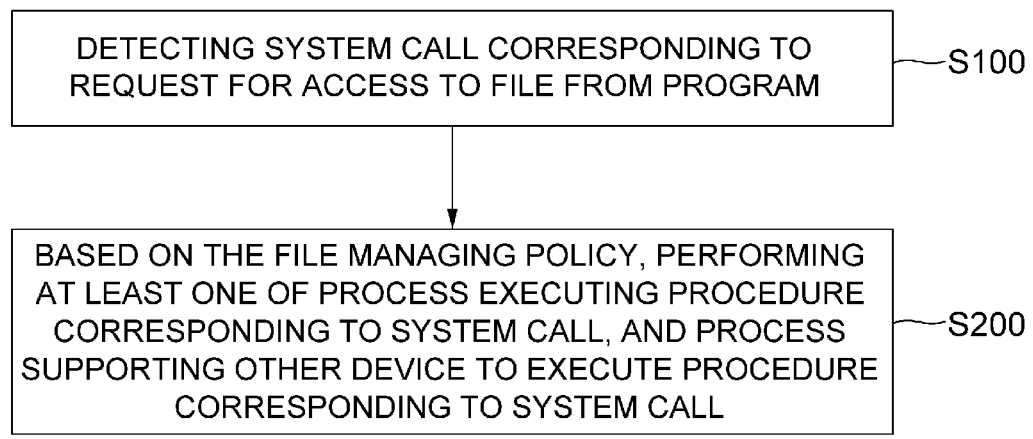
FIG. 2 is a flowchart illustrating exemplarily the method for managing the files in accordance with the present disclosure.

FIG. 2 is a flowchart illustrating exemplarily the method for managing the files in accordance with the present disclosure.

By referring to FIG. 2, the method for managing the files in accordance with the present disclosure includes a step of the file managing device 100 detecting the system call corresponding to a request for access of a file from a program executed by the file managing device.

Herein, "access to a file" may include creation, write, read, copy, modification, delete, move, etc. of a file.

Additionally, there may be various methods of embodiments of detecting the system call at the step S100 and one example may be a method of using a file filter driver, which is a method of registering and using preoperation and postoperation callback routines at the time of creation of a file mini filter. Another example may be a method of hooking a System Service Dispatcher Table. Further details on various methods that implement detection of the system call will not be explained as it is not necessary for understanding the present disclosure, and these may be known or easily understood by those skilled in the art.

For reference, a list of Native API functions of the Windows, that are generally called by the system call corresponding to the access request to the file, may include table 1 below. Native API function names, corresponding Win32 API function names and explanation on the Native API functions are described from the leftmost column of table 1.

TABLE 1

File and general input/output
As file input/output is used by many device drivers,
Native APIs are best documented.
DDK means Driver Development Kit

| | | | |
|---|---|---|---|
| NtCancelIoFile | CancelIo | Cancel I/O request | |
| NtCreateFile | CreateFile, CreateDirectory, CreateDirectoryEx | Create and open file, directory or device object | DDK |
| NtCreateIoCompletion | CreateIoCompletion Port | Request notifying thread of completion to input/output manager if input/out is completed | |
| NtOpenIoCompletion | | Open input/output object with designated name | |
| NtSetIoCompletion | | Set properties of objects whose input/output is completed | |

TABLE 1-continued

| | | | |
|---|---|---|---|
| NtQueryIoCompletion | | Retrieve specific info about objects whose input/output is completed | |
| NtRemoveIoCompletion | | Remove callbacks whose input/output is completed | |
| NtDeleteFile | DeleteFile | Delete file object | |
| NtDeviceIoControlFile | DeviceIoControl | Send IOCTL to device driver of device represented as open file object | |
| NtFlushBuffersFile | FlushFileBuffers | Write all file data in memory to disk | |
| NtFsControlFile | DeviceIoControl | Send IOCTL to device represented as open file object This is used typically in special commands related to a file system | |
| NtLockFile | LockFile, LockFileEx | Lock files of certain range for synchronized access | |
| NtUnlockFile | UnlockFile | Unlock files of certain range for synchronized access | |
| NtNotifyChangeDirectoryFile | FindFirstChangeNotification, FindNextChangeNotification | Register thread to be notified when content of directory changes | |
| NtOpenFile | OpenFile | Open existing file | |
| NtQueryAttributesFile | GetFileAttributesEx | Acquire property of file | |
| NtQueryDirectoryFile | FindFirstFile, FindFirstFileEx, FindNextFile | Retrieve content of directory | |
| NtQueryEaFile | | Retrieve extended properties of file | |
| NtSetEaFile | | Set extended properties of file | |
| NtQueryFullAttributesFile | | Introduced in NT 4.0. Acquire all properties of file | |
| NtQueryInformationFile | GetShortPathName, GetLongPathName, GetFullPathName, GetFileType, GetFileSize, GetFileTime | Retrieve specific info about file | DDK |
| NtSetInformationFile | SetEndOfFile, SetFileAttributes, SetNamedPipeHandle State, SetMailslotInfo | Set specific info about file | DDK |
| NtQueryVolumeInformationFile | GetDiskFreeSpace, GetDriveType | Retrieve specific info about disk volume | |
| NtSetVolumeInformationFile | SetVolumeLabel | Set info about volume | |
| NtReadFile | ReadFile, ReadFileEx | Read data from file | DDK |
| NtWriteFile | WriteFile, WriteFileEx | Write data to file | DDK |
| NtReadFileScatter | ReadFileScatter | Introduced in NT 4.0 SP2 for SQL server Read data from file into virtually discontiguous buffers | |
| NtWriteFileGather | WriteFileGather | Introduced in NT 4.0 SP2 for SQL server Write data from virtually discontiguous buffers to file | |
| NtQueryQuotaInformationFile | IDiskQuotaControl:: | Newly introduced in Win2K. Win2K supports NTFS disk quota. Query disk quota info | |
| NtSetQuotaInformationFile | IDiskQuotaControl:: | Newly introduced in Win2K. Win2K supports NTFS disk quota. Set disk quota info | |

TABLE 1-continued

| | | |
|---|---|---|
| NtReadFile64 | ReadFileVlm | Newly introduced in Win2K. Read data from file into 64 bit virtual memory |
| NtWriteFile64 | WriteFileVlm | Newly introduced in Win2K. Write data from 64 bit virtual memory to file |

By referring to FIG. 2 again, the method of managing the files in accordance with the present disclosure, further comprises a step S200 of the file managing device 100, by referring to the detected system call and one or more parameters of the system call, performing at least one of (i) a process of execution of a procedure corresponding to the system call and (ii) a process of supporting execution of the procedure corresponding to the system call, based on at least one preset file management policy. Herein the file management policy includes a local file naming policy for the file managing device 100 to determine at least one of (i) a file name by which a file is saved or to be saved and (ii) a path by which the file is saved or to be saved, among the parameters of the detected system call, by referring to one or more attributes of the file. Additionally, the attributes of the file include at least part of a creation date and time, a modification date and time, a file type, a file title, an owner, a creator, access privilege, origin information, version information, situational information, a keyword and a subtitle.

One example of a function to be called as parameters of the system call and the system call referred to, at the step S200, may include NTSTATUS NtCreateFile( ) which is a Native API function that creates a file, and is shown in table 2 below with the parameters.

TABLE 2

```
NTSTATUS NtCreateFile(
    _Out_      PHANDLE FileHandle,
    _In_       ACCESS_MASK DesiredAccess,
    _In_       POBJECT_ATTRIBUTES ObjectAttributes,
    _Out_      PIO_STATUS_BLOCK IoStatusBlock,
    _In_opt_   PLARGE_INTEGER AllocationSize,
    _In_       ULONG FileAttributes,
    _In_       ULONG ShareAccess,
    _In_       ULONG CreateDisposition,
    _In_       ULONG CreateOptions,
    _In_       PVOID EaBuffer,
    _In_       ULONG EaLength
);
```

These enumerated parameters of NtCreateFile( ) include parameters preferred for use for creation of a file or parameters as a resultant value of creation of a file. Taking an example of access that creates a file, at the step S200, the file managing device 100 detects the system call and the parameters thereof corresponding to NtCreateFile( ) and based on the properties of the file, which may be extracted from the parameters or read separately, determines a file name by which the file is to be created and saved and/or a path to be saved.

More specifically, the file managing device 100 may determine at least one of the file name, the subtitle, the file type, the creation date and time and the creator among the attributes of the file, by referring to the system call detected at the step S100 and the parameters of the system call, and the file managing device 100 may determine the version information of the file, by referring to the information about the user who is the creator of the file and generated the request to access the file, and the file managing device 100 may determine the keyword of the file, based on the contents being saved in the file.

Additionally, the file name or the storage path of the file is determined based on the local file naming policy and such the local file naming policy may determine that the file name of the file is separated by preset delimiters and is a character string composed of at least one item among the creation date and time, the modification date and time, the file type, the file name, the owner, the creator, the access privilege, the origin information, the version information, the situational information, the keyword and the subtitle, which are arranged in a preset order, and that the delimiters are not included in the items constructing the character string. For example, such a file name may be a string composed in the order of "creation date and time(year month day)-file type-file name-creator's organization/creator-version information-subtitle".

Additionally the storage path by which the file is saved may be composed of a folder structure classified by, e.g., the keywords and the subtitles, e.g., the local file policy may be composed of, if the keyword is "trade policy", the storage path of the file saved being determined as "work data folder\trade policy\", and if the keywords of the file only include keywords not corresponding to work data or if the keywords corresponding to work data do not exist, the storage path of the file saved being determined as "personal data folder\".

Further, in one example embodiment of creation of the file name, at the step of S200, if the access to the file corresponds to creating, copying or moving of the file, and if the name of the file does not conform to the local file naming policy, the file managing device 100 may perform at least one of (i) a process of creating a new file name of the file conforming to the local file naming policy, and of executing a procedure corresponding to the system call instructing the file managing device 100 to save the file with the new file name, and (ii) a process of supporting other device to execute a procedure corresponding to the system call.

Additionally, the creation of the file name in accordance with the present disclosure may include a case of creating the file name identical to the name of an existing file.

The creation of the file name is not limited to a case at the time of creation, copy or move of the file and may be accomplished at the time of modification or even of deletion of the existing file. The file management policy may be configured to conserve information of the existing file and save the file with the new file name without overwriting the information of the existing file with new information. Further, the file management policy may be configured to make the file appear as if the file is deleted to users without removing the information on the existing file from the device at the time of the file being deleted, by changing the file name as indicating deletion. For example, the file management policy may be configured to indicate a deleted file by adding "[DELETED]" at the start of the file name among the properties of the file, and hide the file when listing the files in the folder.

Figure 3:
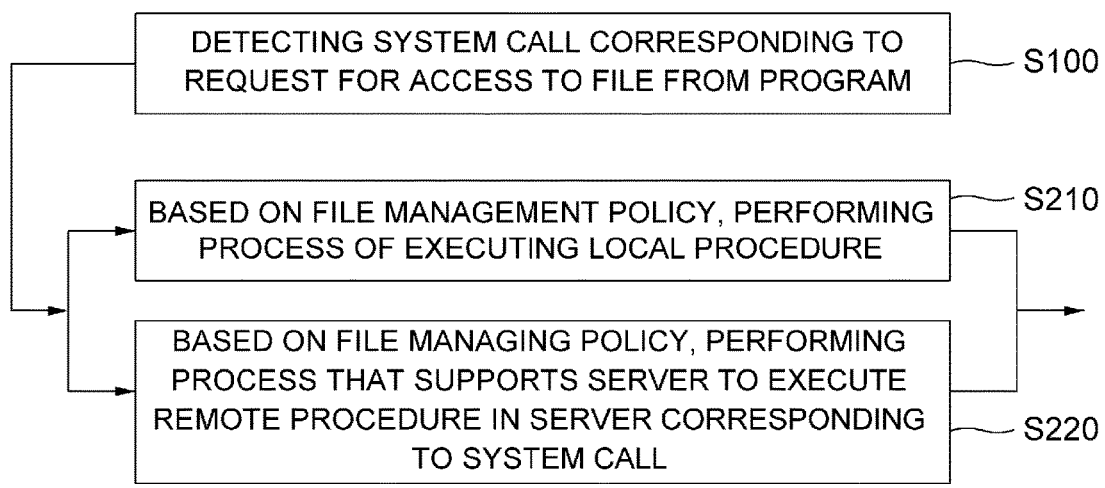
FIG. 3 is a flowchart specifying one example embodiment of the method for managing files as shown in FIG. 2.

Next, FIG. 3 is a flowchart specifying one example embodiment of the method for managing the files as shown in FIG. 2.

By referring to FIG. 3, the step S200 may be specified to implement synchronization in accordance with the present disclosure, and in the example related to the synchronization, the step S200 may include the file managing device 100, by referring to the detected system call and the parameters of the system call, performing at least one of (b1) a process of execution of a local procedure, which is a procedure in the file managing device 100, and (b2) a process of supporting a server 200 to execute a remote procedure, which is a procedure in the server 200 corresponding to the system call, based on the file management policy. Herein, the local procedure may be a procedure performed in the file managing device 100, meaning a procedure that processes storing or deleting, etc. of a file on a local side (the file managing device) and the remote procedure means a procedure of synchronization by processing storing or deleting, etc. of the file in the server 200 linked with the file managing device 100. As the case may be, only the file managing device 100 may save or delete etc. a file or only the server 200 may save or delete etc. a file.

Figure 4:
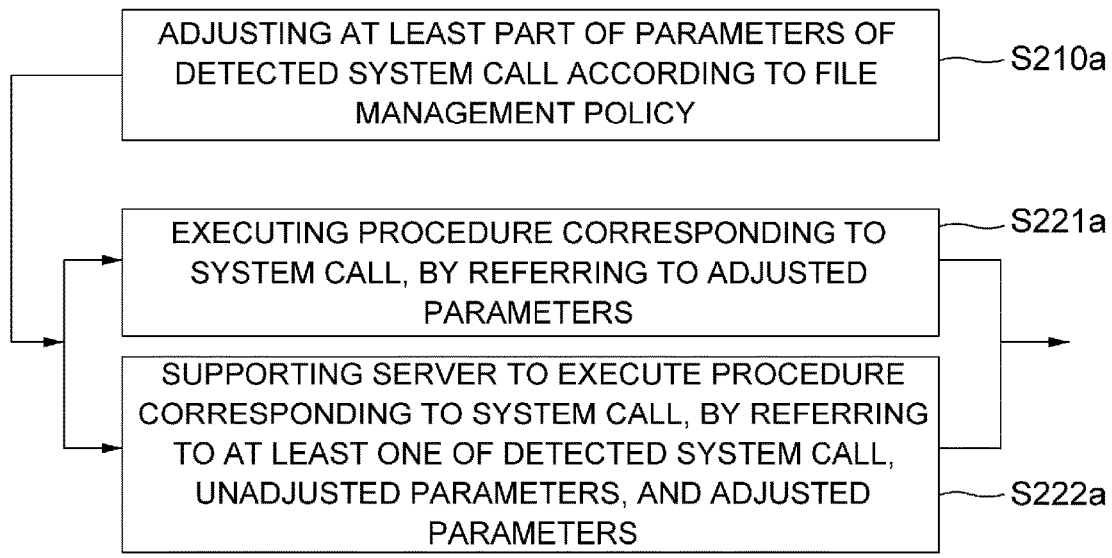
FIG. 4 is a flowchart illustrating one example embodiment specifying the step S200 shown in FIG. 2.

Next, FIG. 4 is a flowchart illustrating a first example specifying the step S200 shown in FIG. 2.

By referring to FIG. 4, the first example is illustrated specifying a method of the file managing device 100 performing the step of S200 by referring to the detected system call and the parameters thereof, based on the preset file management policy, wherein the step S200 may include the step S210a of the file managing device 100 adjusting at least part of the parameters of the detected system call according to the file management policy; and the step S220a of the file managing device 100 performing at least one of (i) the process S221a of the file managing device 100 executing a procedure corresponding to the system call, by referring to the adjusted parameters, and (ii) the process S222a supporting the server 200 to execute a procedure corresponding to the system call according to the preset file management policy, by referring to at least one of the detected system call, the unadjusted parameters of the system call, and the adjusted parameters.

Taking the example of the creation of the file aforementioned, in this first example, NtCreateFile( ) may be a procedure corresponding to the system call, thus at the step of S210a, the parameters of the system call are changed according to the file management policy. At the next step of S220a, in case the process S221a is performed, a file may be created in the file managing device by calling NtCreateFile( ) with the adjusted parameters, and in case the process S222a is performed, the server 200 may be instructed to execute a procedure identical or similar to NtCreateFile( ) to create a file according to the preset file management policy.

Figure 5:
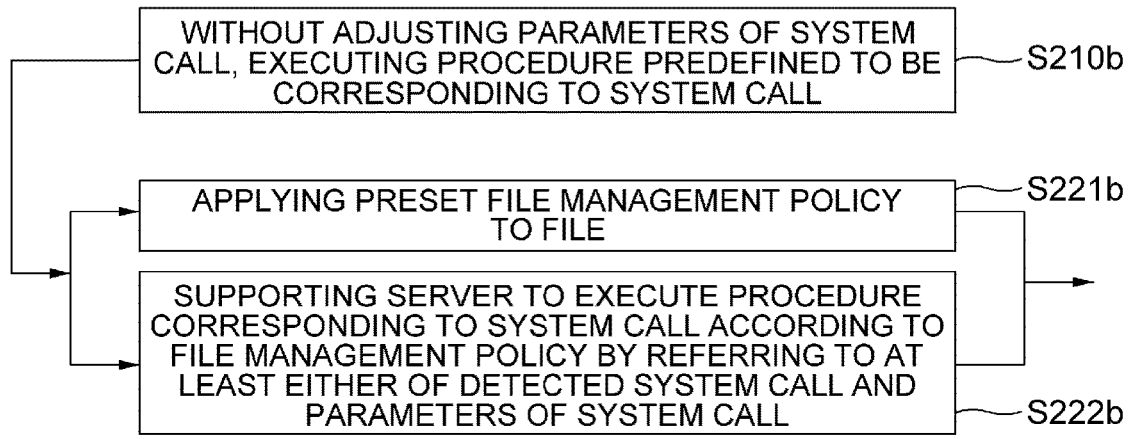
FIG. 5 is a flowchart illustrating another example embodiment specifying the step S200 shown in FIG. 2.

Next, FIG. 5 is a flowchart illustrating another example embodiment specifying the step S200 shown in FIG. 2.

By referring to FIG. 5, a second example is illustrated specifying a method of the file managing device 100 performing the step S200, wherein the step S200 may include, without adjusting the parameters of the system call, the step S210b of the file managing device 100 executing a procedure predefined to be corresponding to the system call; and the step S220b of the file managing device 100 performing at least one of (i) the process S221b of applying the preset file management policy to the file, and (ii) the process S222b of supporting the server 200 to execute a procedure corresponding to the system call according to the preset file management policy by referring to at least either of the detected system call and the parameters of the system call.

Taking the example of creating a file aforementioned, in this second example, NtCreateFile( ) may be a procedure corresponding to the system call, thus at the step of S210b, a file is created in the file management device 100 by calling NtCreateFile( ) with the parameters as is, without adjusting the parameters of the system call. Next, the process S221b may be performed that applies the file management policy through execution of a procedure which changes the file created before by referring to NtCreateFile( ) and the parameters thereof, or the server 200 may be instructed to execute a procedure identical or similar to NtCreateFile( ) to create a file according to the preset file management policy.

In the examples aforementioned, the access regarding creation of a file is disclosed, however, it may be understood by those skilled in the art that the present disclosure applies to other types of file access such as modification, deletion, move, etc. of the file as well as creation of the file.

In one embodiment aforementioned by referring to FIG. 3 to implement the synchronization in accordance with the present disclosure, the file management policy may further include the file transmission policy for handling file transmission from the file managing device 100 to the server 200, and the step S210 may include, wherein, if access to the file is detected as satisfying at least one specific access condition, the file managing device 100 performing at least one of (i) a process S211 that executes a local procedure which is a procedure in the file managing device 100, and (ii) a process S212 that supports the server 200 to execute a remote procedure which is a procedure in the server 200 corresponding to the system call, based on the local file naming policy and the file transmission policy determined regarding the specific access condition.

Such the specific access condition may be satisfied if the access to the file corresponds to access that creates, copies or moves the file into a specific path. For example, in case the file transmission policy, determined with regard to a first specific folder (a path) prepared in the file managing device 100 for a specific department the user belongs to, <s> is determined as a policy that</s> forces a same file to be stored in a second specific folder of the server 200, if the user wants to save the file in the first specific folder, the file may be saved in the first specific folder of the file managing device 100 and in the second specific folder of the server 200.

Additionally, the specific access condition may be satisfied if the access to the file corresponds to an access that creates, copies or moves the file into the specific path and the file belongs to a specific file type, or if the access to the file is generated by a specific program and the file belongs to the specific file type. In the latter case, the file transmission policy may be determined with regard to a file access corresponding to the file type, e.g., ".doc" generated by "MS Word".

The file transmission policy may include an encryption policy that strengthens the security by encrypting information transmitted to the server 200 if one or more preset conditions are met.

Additionally, such the file transmission policy may include one or more file transmission modes, wherein the file transmission modes may include a copy mode that allows the same file to be created or identically modified in the server 200 when the file is created or modified in the file managing device 100, a traceless mode that allows the same file to be created or identically modified in the server 200 without leaving any trace in the file managing device 100 and a trace mode that allows the same file to be created or identically modified in the server 200 only and that stores the saving location for the file managing device 100 to refer to the file stored in the server 200, etc.

Specifically, in one embodiment where the file transmission mode is the copy mode of the file transmission policy, at the step S200, both of the processes S210 and S220 may be performed, wherein the process S210 performs a procedure in the file managing device corresponding to the system call and the process S220 supports the server to execute a remote procedure which is a procedure in the server corresponding to the system call, by transmitting to the server at least part of information among the system call, the unadjusted parameters of the system call, the attributes being written of the file or the file management policy.

Next, in one embodiment where the file transmission mode is the traceless mode of the file transmission policy, the step S200 includes performing of the process S210 and then of the process S220 by referring to the result of the process S210, wherein the process S210 supports the server to execute a remote procedure which is a procedure in the server corresponding to the system call, by transmitting to the server at least part of information among the system call, the unadjusted parameters of the system call, the attributes being written of the file or the file management policy, without performing a procedure in the file managing device corresponding to the system call, and wherein the process S220 performs virtualization of a folder by acquiring a result of execution of the remote procedure from the server and returning the result as a return value of the system call.

Herein, the part where the virtualization of the folder is performed by acquiring the result of execution of the remote procedure and returning the result as a return value of the system call, is further described in detail by referring to the Native API functions shown in table 3 below as one embodiment, and the Native API functions relate to reading of a file.

TABLE 3

NTSTATUS NtOpenFile(
  _Out_ PHANDLE FileHandle,
  _In_ ACCESS_MASK DesiredAccess,
  _In_ POBJECT_ATTRIBUTES ObjectAttributes,
  _Out_ PIO_STATUS_BLOCK IoStatusBlock,
  _In_ ULONG ShareAccess,
  _In_ ULONG OpenOptions
);
NTSTATUS ZwReadFile(
  _In_ HANDLE FileHandle,
  _In_opt_ HANDLE Event,
  _In_opt_ PIO_APC_ROUTINE ApcRoutine,
  _In_opt_ PVOID ApcContext,
  _Out_ PIO_STATUS_BLOCK IoStatusBlock,
  _Out_ PVOID Buffer,
  _In_ ULONG Length,
  _In_opt_ PLARGE_INTEGER ByteOffset,
  _In_opt_ PULONG Key
);

The method of reading a file in the Windows system is mostly a method of acquiring a file handle by opening an existing file with NtOpenFile and reading the content of the file by using the file handle as a parameter of ZwReadFile( ) and such file handling does not vary among operating systems. In table 3 above, the part shown as "_Out_ PHANDLE FileHandle" means FileHandle which is a file handle, is acquired as a result of NtOpenFile( ) and the part shown as "_Out_ PVOID Buffer" means a pointer which indicates an address of a memory where the content of the file is read and stored as a result of ZwReadFile( ) is acquired. As this indicates the address of the memory, where the content of the file is read and stored, may be referred to, the program may handle the content of the file with the pointer received as a return value of the system call.

In accordance with one example embodiment corresponding to the traceless mode, without performing NtOpenFile( ) ZwReadFile( ) etc. on a local side (the file managing device), the corresponding procedures are performed in the server 200 alone, and the resultant values are returned to the file managing device 100, and the file managing device 100 may make it appear as if the file managing device 100 directly performed the procedures by returning the values as the resultant values of the system calls for each NtOpenFile( ) and ZwReadFile( ). The method that makes a folder presented as existing in the file managing device 100 is called "virtualization" of the folder.

Next, in one embodiment where the file transmission mode is the trace mode of the file transmission policy, the step S200 includes performing of the process S210 and then of the process S220 by referring to the result of the process S210, wherein the process S210 supports the server 200 to execute the remote procedure which is a procedure in the server corresponding to the system call, by transmitting to the server 200 at least part of information among information on the system call, the unadjusted parameters of the system call, the attributes of the file and the file management policy, without performing a procedure in the file managing device corresponding to the system call, and wherein the process S220 includes a process S221 of acquiring the result of execution of the remote procedure from the server 200 and returning the result as the resultant value of the system call, and a process S222, if the access corresponds to an access that creates, copies or moves the file, of saving the storage location where the file is stored in the server at the step of the previous process S210, the storage location being referred to by the file managing device afterwards.

Contrary to the traceless mode, the trace mode may further include the process S222 of recording the storage location, wherein the storage location may be a storage location represented as, e.g., a URL, in which case, the file managing device 100 may refer to the storage location represented as the URL to access the file in the server 200 afterwards. For example, in case the method of an access that fetches a file corresponding to the URL from the server 200 is performed, the file managing device 100 linked with the server 200 may instruct the server 200 to read the file stored in the server 200, and instruct the file managing device 100 to acquire the data read from the file and instruct a program running in the file managing device 100 to utilize the data, by referring to the storage location represented as the URL.

Figure 6:
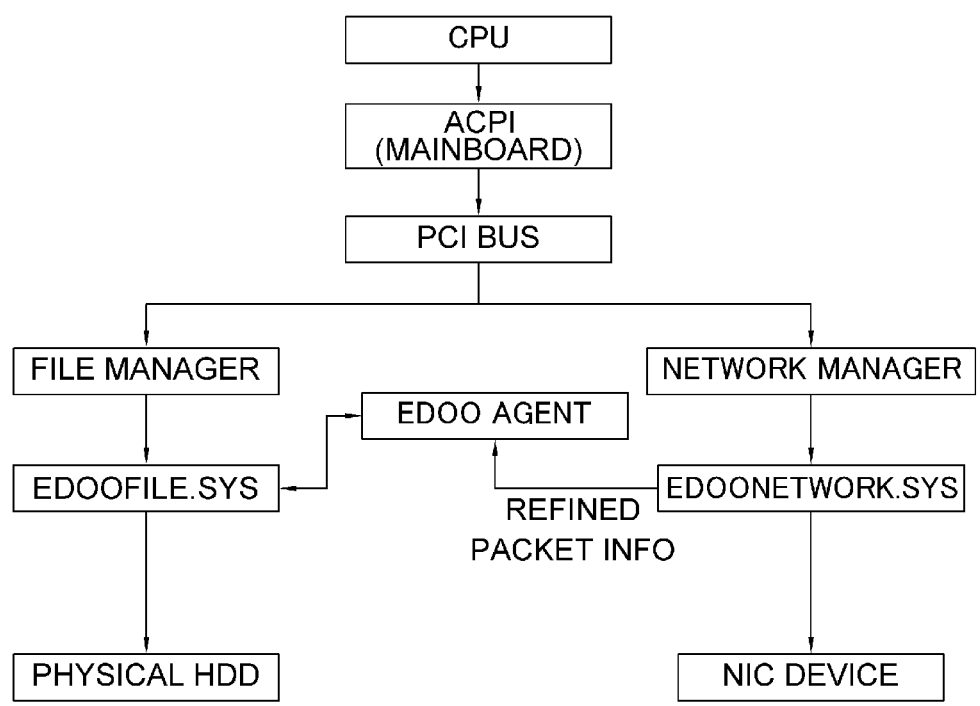
FIG. 6 is a conceptual diagram illustrating an example of the method for managing files implemented on the Windows OS in accordance with the present disclosure.

Next, FIG. 6 is a conceptual diagram illustrating an example of the method for managing files implemented as a device driver in the Windows OS in accordance with the present disclosure.

The Windows operating system may recognize a device as several distinct devices. Herein, the several devices compose a stack in the form of a hierarchy and this is called a device stack. A device stack in the Windows is designed to have at least two layers, which are "a physical layer" and "a function layer". The reason is that every device must be connected to a bus if it is to be introduced to a CPU, and a physical layer is a layer performing a process of the bus allowing the device to be operational in order for the device itself to be operational and a function layer is a layer performing a programming process of the device itself.

In the conceptual diagram of FIG. 6, a device structure of connection from the CPU to a subhierarchy within the file managing device 100 is illustrated exemplarily, wherein, under the CPU is an ACPI (a mainboard) and under the ACPI is a PCI bus, and a file manager and a network manager are connected to the PCI bus, and by inserting one or more device drivers like Edoofile.sys between the file manager and the device stack connected to a physical storage, e.g., a physical HDD, the driver of Edoofile.sys may perform (i) a process S210 of executing a local procedure which is a procedure in the file managing device 100 based on the file management policy, and (ii) a process S220, by inserting the device drivers like Edoonetworks.sys between the network manager and the device stack connected to the communication part 110, e.g., a NIC device, of supporting the server 200 to execute a remote procedure which is a procedure in the server 200 corresponding to the system call via the communication part 110. Herein, to implement the method of the present disclosure, a linked operation of information exchange between the driver Edoofile.sys and the driver Edoonetworks.sys may be performed by an agent connecting the two drivers, e.g., an Edoo agent. For example, the information exchanged between the two drivers, i.e., shared information, may include, but not limited to, the detected system call, the parameters of the system call or the file management policy, and the shared information may include information required for the respective processes S210 and S220 to be performed properly, e.g., timing information.

In all of the embodiments aforementioned of the present disclosure, the file name and the storage location are set automatically and consistently in the user group according to the content of the file and user privileges, and the file name may be set and applied according to the preset rules, and the result of the file access in the file managing device 100 may be applied and synchronized in the server 200.

Based on the explanation of the above embodiment, those skilled in the art can clearly understand that the present disclosure can be implemented by combination of software and hardware or hardware alone.

In accordance with the present disclosure, according to contents of a file and privileges of a user, management of the files is carried out with ease and efficiency in a user group by determining a file name and storage location consistently in the user group. Further, files identical to the files created in the user group are easily stored on a server in a cloud environment.

The part contributing to the prior art or the object of a technical solution of the present disclosure may be implemented in a form of executable program command through a variety of computer components and recorded to computer readable media. The computer readable media may include solely or in combination, program commands, data files, and data structures. The program commands recorded to the media may be components specially designed for the present disclosure or may be known and usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level language code that can be executed by a computer using an interpreter, etc. The hardware device can work as more than a software module to perform the process in accordance with the present disclosure and they can do the same in the opposite case. The hardware device may include a processor such as a CPU or a GPU, combined with a memory device such as ROM or RAM to store the program commands, configured to execute the commands stored in the memory, and a communication part which can exchange signals with external devices. In addition, the hardware device may include a keyboard, a mouse, and any other external input device to receive commands prepared by developers.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Especially, although the concepts used in an operating system is explained in the present specification taking an example of the Windows OS of the Microsoft, those skilled in the art can clearly understand that the concepts like a user mode, a kernel mode, and a system call, etc. in accordance with the present disclosure are not limited to the Windows OS and that the present disclosure does not apply to the Windows OS alone. For example, operating systems, to which the present disclosure may apply, may include Darwin, RTXC, Linux, Unix, OS X and an embedded operating system like VxWorks.

Accordingly, the thought of the present disclosure must not be confined to the explained embodiments, and the following patent claims as well as everything including variations equal or equivalent to the patent claims pertain to the category of the thought of the present disclosure.

What is claimed is:
1. A method for managing files, comprising steps of:
(a) a file managing device detecting a system call corresponding to a request for access of a file from a program executed by the file managing device; and
(b) the file managing device, by referring to the detected system call and one or more parameters of the system call, performing at least one of
   (i) a process of execution of a procedure corresponding to the system call and
   (ii) a process of supporting execution of the procedure corresponding to the system call, based on at least one preset file management policy;
wherein the file management policy includes a local file naming policy for the file managing device to determine at least one of
   (i) a file name by which the file is saved or to be saved and
   (ii) a path by which the file is saved or to be saved, among the parameters of the detected system call, by referring to an attribute of the file, and
wherein the attribute of the file has at least part of a creation date and time, a modification date and time, a file type, a file title, an owner, a creator, an access privilege, origin information, version information, situational information, a keyword and a subtitle;
wherein, at the step of (b), the file managing device, by referring to the detected system call and the parameters of the system call, performs at least one of
   (b1) a process of execution of a local procedure, which is a procedure in the file managing device, and

(b2) a process of supporting a server to execute a remote procedure, which is a procedure in the server corresponding to the system call, based on the file management policy;
wherein the file management policy further includes at least one file transmission policy for handling file transmission from the file managing device to the server,
wherein, if a file transmission mode of the file transmission policy corresponds to a copy mode, the step of (b) includes performing both of the process of (b1) and the process of (b2), and
wherein the process of (b1) performs a procedure in the file managing device corresponding to the system call, and wherein the process of (b2) supports the server to execute a remote procedure which is a procedure in the server corresponding to the system call, by transmitting to the server at least part of information among information on the system call, unadjusted parameters of the system call, the at least one attribute of the file and the file management policy.

2. The method of claim 1, wherein, at the step of (b), including steps of:
(ba1) the file managing device adjusting at least part of the parameters of the detected system call by referring to the file management policy; and
(ba2) the file managing device performing at least one of
(i) a process of execution of a procedure corresponding to the system call by referring to the adjusted parameters, and (ii) a process of supporting a server to execute, according to the preset file management policy, a procedure corresponding to the system call by referring to at least one of the detected system call, the unadjusted parameters of the system call and the adjusted parameters.

3. The method of claim 1, wherein, at the step of (b), including steps of:
(bb1) the file managing device executing a procedure predefined to correspond to the system call, without adjusting the parameters of the system call; and
(bb2) the file managing device performing at least one of
(i) a process of applying the preset file management policy to the file, and (ii) a process of supporting a server to execute a procedure corresponding to the system call according to the preset file management policy, by referring to at least one of the detected system call and the parameters of the system call.

4. The method of claim 1, wherein the file management policy further includes at least one file transmission policy for handling file transmission from the file managing device to the server, and
wherein, at the step of (b), if an access to the file is detected as satisfying at least one specific access condition, the file managing device performs at least one of
(i) a process of execution of a local procedure which is a procedure in the file managing device, and (ii) a process of instructing the server to execute a remote procedure which is a procedure in the server corresponding to the system call, based on the local file naming policy and the file transmission policy determined regarding the specific access condition.

5. The method of claim 4, wherein the specific access condition is satisfied if the access to the file corresponds to an access that creates, copies or moves the file to a specific path.

6. The method of claim 4, wherein the specific access condition is satisfied, if the access to the file corresponds to an access that creates, copies or moves the file to a specific path and if the file belongs to a specific file type.

7. The method of claim 4, wherein the specific access condition is satisfied, if the access to the file is generated by a specific program and if the file belongs to a specific file type.

8. A method for managing files, comprising steps of:
(a) a file managing device detecting a system call corresponding to a request for access of a file from a program executed by the file managing device; and
(b) the file managing device, by referring to the detected system call and one or more parameters of the system call, performing at least one of
(i) a process of execution of a procedure corresponding to the system call and
(ii) a process of supporting execution of the procedure corresponding to the system call, based on at least one preset file management policy;
wherein the file management policy includes a local file naming policy for the file managing device to determine at least one of
(i) a file name by which the file is saved or to be saved and
(ii) a path by which the file is saved or to be saved, among the parameters of the detected system call, by referring to an attribute of the file, and
wherein the attribute of the file has at least part of a creation date and time, a modification date and time, a file type, a file title, an owner, a creator, an access privilege, origin information, version information, situational information, a keyword and a subtitle;
wherein, at the step of (b), the file managing device, by referring to the detected system call and the parameters of the system call, performs at least one of
(b1) a process of execution of a local procedure, which is a procedure in the file managing device, and
(b2) a process of supporting a server to execute a remote procedure, which is a procedure in the server corresponding to the system call, based on the file management policy;
wherein the file management policy further includes at least one file transmission policy for handling file transmission from the file managing device to the server,
wherein, if the file transmission mode of the file transmission policy corresponds to a traceless mode, the step of (b) includes (i) performing the process of (b2) and (ii) performing, by referring to a result of the process of (b2), the process of (b1),
wherein the process of (b2) supports the server to execute a remote procedure which is a procedure in the server corresponding to the system call, by transmitting to the server at least part of information among information on the system call, unadjusted parameters of the system call, the one or more attributes of the file and the file management policy, without performing the procedure in the file managing device corresponding to the system call, and
wherein the process of (b1) acquires a result of execution of the remote procedure from the server and returns a return value corresponding to the system call and performs virtualization of one or more folders.

9. A method for managing files, comprising steps of:
(a) a file managing device detecting a system call corresponding to a request for access of a file from a program executed by the file managing device; and (b) the file managing device, by referring to the detected system call and one or more parameters of the system call, performing at least one of
  (i) a process of execution of a procedure corresponding to the system call and
  (ii) a process of supporting execution of the procedure corresponding to the system call, based on at least one preset file management policy;
wherein the file management policy includes a local file naming policy for the file managing device to determine at least one of
  (i) a file name by which the file is saved or to be saved and
  (ii) a path by which the file is saved or to be saved, among the parameters of the detected system call, by referring to an attribute of the file, and
wherein the attribute of the file has at least part of a creation date and time, a modification date and time, a file type, a file title, an owner, a creator, an access privilege, origin information, version information, situational information, a keyword and a subtitle;
wherein, at the step of (b), the file managing device, by referring to the detected system call and the parameters of the system call, performs at least one of
  (b1) a process of execution of a local procedure, which is a procedure in the file managing device, and
(b2) a process of supporting a server to execute a remote procedure, which is a procedure in the server corresponding to the system call, based on the file management policy;
  wherein the file management policy further includes at least one file transmission policy for handling file transmission from the file managing device to the server,
  wherein, if the file transmission mode of the file transmission policy corresponds to a trace mode, the step of (b) includes (i) performing the process of (b2) and (ii) performing, by referring to a result of the process of (b2), the process of (b1),
  wherein the process of (b2) supports the server to execute a remote procedure which is a procedure in the server corresponding to the system call, by transmitting to the server at least part of information among information on the system call, unadjusted parameters of the system call, the one or more attributes of the file and the file management policy, without performing the procedure in the file managing device corresponding to the system call, and
  wherein the process of (b1) includes (i) a process of acquiring a result of execution of the remote procedure from the server and returning the result as a return value corresponding to the system call, and (ii) a process, if the access corresponds to an access that creates, copies or moves the file, of storing a specific location where a file is saved in the server, the specific location being referred to by the file managing device afterwards.

10. The method of claim 1, wherein the file managing device determines at least one of the file name, the subtitle, the file type, the creation date and time and the creator of the file, by referring to the detected system call and the parameters of the system call,
  wherein the file managing device determines the version information of the file by referring to information on a user of the file, which represents information on who created the file and information on who generated a request for an access to the file, and
  wherein the file managing device determines the keyword based on contents stored in the file.

11. A method for managing files, comprising steps of:
(a) a file managing device detecting a system call corresponding to a request for access of a file from a program executed by the file managing device; and
(b) the file managing device, by referring to the detected system call and one or more parameters of the system call, performing at least one of
  (i) a process of execution of a procedure corresponding to the system call and
  (ii) a process of supporting execution of the procedure corresponding to the system call, based on at least one preset file management policy;
wherein the file management policy includes a local file naming policy for the file managing device to determine at least one of
  (i) a file name by which the file is saved or to be saved and
  (ii) a path by which the file is saved or to be saved, among the parameters of the detected system call, by referring to an attribute of the file, and
wherein the attribute of the file has at least part of a creation date and time, a modification date and time, a file type, a file title, an owner, a creator, an access privilege, origin information, version information, situational information, a keyword and a subtitle;
  wherein the local file naming policy determines that the file name of the file is separated by one or more preset delimiters, wherein the file name is a character string comprised of at least one item among the creation date and time, the modification date and time, the file type, the file name, the owner, the creator, the access privilege, the origin information, the version information, the situational information, the keyword and the subtitle, which are arranged in a preset order, and
  wherein the local file naming policy determines that the delimiters are not included in the items constructing the character string.

12. A method for managing files, comprising steps of:
(a) a file managing device detecting a system call corresponding to a request for access of a file from a program executed by the file managing device; and
(b) the file managing device, by referring to the detected system call and one or more parameters of the system call, performing at least one of
  (i) a process of execution of a procedure corresponding to the system call and
  (ii) a process of supporting execution of the procedure corresponding to the system call, based on at least one preset file management policy;
wherein the file management policy includes a local file naming policy for the file managing device to determine at least one of
  (i) a file name by which the file is saved or to be saved and
  (ii) a path by which the file is saved or to be saved, among the parameters of the detected system call, by referring to an attribute of the file, and
wherein the attribute of the file has at least part of a creation date and time, a modification date and time, a file type, a file title, an owner, a creator, an access privilege, origin information, version information, situational information, a keyword and a subtitle;
  wherein, at the step of (b), if an access to the file corresponds to creating, copying or moving of the file, and if the file name of the file does not conform to the local file naming policy, the file managing device performs at least one of (i) a process of creating a new file name of the file that conforms to the local file naming policy and executing a procedure corresponding to the system call in order for the file to be stored with the new file name in the file managing device, and (ii) a process of supporting other device to execute a procedure corresponding to the system call.

13. A method for managing files, comprising steps of:
(a) a file managing device detecting a system call corresponding to a request for access of a file from a program executed by the file managing device; and
(b) the file managing device, by referring to the detected system call and one or more parameters of the system call, performing at least one of
  (i) a process of execution of a procedure corresponding to the system call and
  (ii) a process of supporting execution of the procedure corresponding to the system call, based on at least one preset file management policy;
wherein the file management policy includes a local file naming policy for the file managing device to determine at least one of
  (i) a file name by which the file is saved or to be saved and
  (ii) a path by which the file is saved or to be saved, among the parameters of the detected system call, by referring to an attribute of the file, and
wherein the attribute of the file has at least part of a creation date and time, a modification date and time, a file type, a file title, an owner, a creator, an access privilege, origin information, version information, situational information, a keyword and a subtitle;
wherein, at the step of (b), the file managing device, by referring to the detected system call and the parameters of the system call, performs at least one of
  (b1) a process of execution of a local procedure, which is a procedure in the file managing device, and
  (b2) a process of supporting a server to execute a remote procedure, which is a procedure in the server corresponding to the system call, based on the file management policy;
wherein the method for managing files is performed on the Microsoft Windows OS,
wherein the process of (b1) is performed by a first device driver inserted between a file manager and a storage device driver of the OS, the file manager and the storage device driver being included in a device stack, and
wherein the process of (b2) is performed by a second device driver inserted between a network manager and a communication device driver of the OS, the network manager and the communication device driver being included in the device stack.

14. A file managing device for managing files, comprising:
a communication part; and
a processor for (I) detecting a system call corresponding to a request for access of a file from a program executed by the file managing device, and (II) performing, by referring to the detected system call and one or more parameters of the system call, at least one of
  (i) a process of execution of a procedure corresponding to the system call and
  (ii) a process of supporting execution of the procedure corresponding to the system call, based on at least one preset file management policy;
wherein the file management policy includes a local file naming policy for the file managing device to determine at least one of
  (i) a file name by which the file is saved or to be saved and
  (ii) a path by which the file is saved or to be saved, among the parameters of the detected system call, by referring to an attribute of the file, and
wherein the attribute of the file has at least part of a creation date and time, a modification date and time, a file type, a file title, an owner, a creator, an access privilege, origin information, version information, situational information, a keyword and a subtitle
wherein the processor, by referring to the detected system call and the parameters of the system call, performs at least one of
  (II1) a process of execution of a local procedure, which is a procedure in the file managing device, and
  (II2) a process of supporting a server to execute a remote procedure, which is a procedure in the server corresponding to the system call, based on the file management policy;
wherein the file management policy further includes at least one file transmission policy for handling file transmission from the file managing device to the server,
wherein, if a file transmission mode of the file transmission policy corresponds to a copy mode, the processor performs both of the process of (II1) and the process of (II2), and
wherein the process of MO performs a procedure in the file managing device corresponding to the system call, and wherein the process of (II2) supports the server to execute a remote procedure which is a procedure in the server corresponding to the system call, by transmitting to the server at least part of information among information on the system call, unadjusted parameters of the system call, the at least one attribute of the file and the file management policy.

15. The server of claim 14, wherein, the processor performs:
(II-i1) adjusting at least part of the parameters of the detected system call by referring to the file management policy; and
(II-i2) at least one of (i) a process of execution of a procedure corresponding to the system call by referring to the adjusted parameters, and (ii) a process of supporting a server to execute, according to the preset file management policy, a procedure corresponding to the system call by referring to at least one of the detected system call, the unadjusted parameters of the system call and the adjusted parameters.

16. The server of claim 14, wherein the processor performs:
(II-ii1) a procedure predefined to correspond to the system call, without adjusting the parameters of the system call; and
(II-ii2) at least one of (i) a process of applying the preset file management policy to the file, and (ii) a process of supporting a server to execute a procedure corresponding to the system call according to the preset file management policy, by referring to at least one of the detected system call and the parameters of the system call.

17. The server of claim 14, wherein the file management policy further includes at least one file transmission policy for handling file transmission from the file managing device to the server, and wherein, if an access to the file is detected as satisfying at least one specific access condition, the processor performs at least one of:
(i) a process of execution of a local procedure which is a procedure in the file managing device, and
(ii) a process of instructing the server to execute a remote procedure which is a procedure in the server corresponding to the system call, based on the local file naming policy and the file transmission policy determined regarding the specific access condition.

18. The server of claim 17, wherein the specific access condition is satisfied if the access to the file corresponds to an access that creates, copies or moves the file to a specific path.

19. The server of claim 17, wherein the specific access condition is satisfied, if the access to the file corresponds to an access that creates, copies or moves the file to a specific path and if the file belongs to a specific file type.

20. The server of claim 17, wherein the specific access condition is satisfied, if the access to the file is generated by a specific program and if the file belongs to a specific file type.

21. A file managing device for managing files, comprising:
 a communication part; and
 a processor for (I) detecting a system call corresponding to a request for access of a file from a program executed by the file managing device, and (II) performing, by referring to the detected system call and one or more parameters of the system call, at least one of
  (i) a process of execution of a procedure corresponding to the system call and
  (ii) a process of supporting execution of the procedure corresponding to the system call, based on at least one preset file management policy;
 wherein the file management policy includes a local file naming policy for the file managing device to determine at least one of
  (i) a file name by which the file is saved or to be saved and
  (ii) a path by which the file is saved or to be saved, among the parameters of the detected system call, by referring to an attribute of the file, and
 wherein the attribute of the file has at least part of a creation date and time, a modification date and time, a file type, a file title, an owner, a creator, an access privilege, origin information, version information, situational information, a keyword and a subtitle;
 wherein the processor, by referring to the detected system call and the parameters of the system call, performs at least one of
  (II1) a process of execution of a local procedure, which is a procedure in the file managing device, and
  (II2) a process of supporting a server to execute a remote procedure, which is a procedure in the server corresponding to the system call, based on the file management policy;
 wherein the file management policy further includes at least one file transmission policy for handling file transmission from the file managing device to the server,
 wherein, if the file transmission mode of the file transmission policy corresponds to a traceless mode, the processor (i) performing the process of (II2) and (ii) performing, by referring to a result of the process of (II2), the process of (II1), wherein the process of (II2) supports the server to execute a remote procedure which is a procedure in the server corresponding to the system call, by transmitting to the server at least part of information among information on the system call, unadjusted parameters of the system call, the one or more attributes of the file and the file management policy, without performing the procedure in the file managing device corresponding to the system call, and
wherein the process of (II1) acquires a result of execution of the remote procedure from the server and returns a return value corresponding to the system call and performs virtualization of one or more folders.

22. A file managing device for managing files, comprising:
 a communication part; and
 a processor for (I) detecting a system call corresponding to a request for access of a file from a program executed by the file managing device, and (II) performing, by referring to the detected system call and one or more parameters of the system call, at least one of
  (i) a process of execution of a procedure corresponding to the system call and
  (ii) a process of supporting execution of the procedure corresponding to the system call, based on at least one preset file management policy;
 wherein the file management policy includes a local file naming policy for the file managing device to determine at least one of
  (i) a file name by which the file is saved or to be saved and
  (ii) a path by which the file is saved or to be saved, among the parameters of the detected system call, by referring to an attribute of the file, and
 wherein the attribute of the file has at least part of a creation date and time, a modification date and time, a file type, a file title, an owner, a creator, an access privilege, origin information, version information, situational information, a keyword and a subtitle;
 wherein the processor, by referring to the detected system call and the parameters of the system call, performs at least one of
  (II1) a process of execution of a local procedure, which is a procedure in the file managing device, and
  (II2) a process of supporting a server to execute a remote procedure, which is a procedure in the server corresponding to the system call, based on the file management policy;
 wherein the file management policy further includes at least one file transmission policy for handling file transmission from the file managing device to the server,
 wherein, if the file transmission mode of the file transmission policy corresponds to a trace mode, the processor performs (i) the process of (II2) and (ii) the process of (II1) by referring to a result of the process of (II2),
 wherein the process of (II2) supports the server to execute a remote procedure which is a procedure in the server corresponding to the system call, by transmitting to the server at least part of information among information on the system call, unadjusted parameters of the system call, the one or more attributes of the file and the file management policy, without performing the procedure in the file managing device corresponding to the system call, and wherein the process of (ill) includes (i) a process of acquiring a result of execution of the remote procedure from the server and returning the result as a return value corresponding to the system call, and (ii) a process, if the access corresponds to an access that creates, copies or moves the file, of storing a specific location where a file is saved in the server, the specific location being referred to by the file managing device afterwards.

23. The server of claim 14, wherein the processor determines at least one of the file name, the subtitle, the file type, the creation date and time and the creator of the file, by referring to the detected system call and the parameters of the system call, wherein the processor determines the version information of the file by referring to information on a user of the file, which represents information on who created the file and information on who generated a request for an access to the file, and wherein the processor determines the keyword based on contents stored in the file.

24. A file managing device for managing files, comprising:
   a communication part; and
   a processor for (I) detecting a system call corresponding to a request for access of a file from a program executed by the file managing device, and (II) performing, by referring to the detected system call and one or more parameters of the system call, at least one of
      (i) a process of execution of a procedure corresponding to the system call and
      (ii) a process of supporting execution of the procedure corresponding to the system call, based on at least one preset file management policy;
   wherein the file management policy includes a local file naming policy for the file managing device to determine at least one of
      (i) a file name by which the file is saved or to be saved and
      (ii) a path by which the file is saved or to be saved, among the parameters of the detected system call, by referring to an attribute of the file, and
   wherein the attribute of the file has at least part of a creation date and time, a modification date and time, a file type, a file title, an owner, a creator, an access privilege, origin information, version information, situational information, a keyword and a subtitle;
      wherein the local file naming policy determines that the file name of the file is separated by one or more preset delimiters, wherein the file name is a character string comprised of at least one item among the creation date and time, the modification date and time, the file type, the file name, the owner, the creator, the access privilege, the origin information, the version information, the situational information, the keyword and the subtitle, which are arranged in a preset order, and
      wherein the local file naming policy determines that the delimiters are not included in the items constructing the character string.

25. A file managing device for managing files, comprising:
   a communication part; and
   a processor for (I) detecting a system call corresponding to a request for access of a file from a program executed by the file managing device, and (II) performing, by referring to the detected system call and one or more parameters of the system call, at least one of
      (i) a process of execution of a procedure corresponding to the system call and
      (ii) a process of supporting execution of the procedure corresponding to the system call, based on at least one preset file management policy;
   wherein the file management policy includes a local file naming policy for the file managing device to determine at least one of
      (i) a file name by which the file is saved or to be saved and
      (ii) a path by which the file is saved or to be saved, among the parameters of the detected system call, by referring to an attribute of the file, and
   wherein the attribute of the file has at least part of a creation date and time, a modification date and time, a file type, a file title, an owner, a creator, an access privilege, origin information, version information, situational information, a keyword and a subtitle;
      wherein, if an access to the file corresponds to creating, copying or moving of the file, and if the file name of the file does not conform to the local file naming policy, the processor performs at least one of (i) a process of creating a new file name of the file that conforms to the local file naming policy and executing a procedure corresponding to the system call in order for the file to be stored with the new file name in the file managing device, and (ii) a process of supporting other device to execute a procedure corresponding to the system call.

26. A file managing device for managing files, comprising:
   a communication part; and
   a processor for (I) detecting a system call corresponding to a request for access of a file from a program executed by the file managing device, and (II) performing, by referring to the detected system call and one or more parameters of the system call, at least one of
      (i) a process of execution of a procedure corresponding to the system call and
      (ii) a process of supporting execution of the procedure corresponding to the system call, based on at least one preset file management policy;
   wherein the file management policy includes a local file naming policy for the file managing device to determine at least one of
      (i) a file name by which the file is saved or to be saved and
      (ii) a path by which the file is saved or to be saved, among the parameters of the detected system call, by referring to an attribute of the file, and
   wherein the attribute of the file has at least part of a creation date and time, a modification date and time, a file type, a file title, an owner, a creator, an access privilege, origin information, version information, situational information, a keyword and a subtitle;
   wherein the processor, by referring to the detected system call and the parameters of the system call, performs at least one of
      (II1) a process of execution of a local procedure, which is a procedure in the file managing device, and
      (II2) a process of supporting a server to execute a remote procedure, which is a procedure in the server corresponding to the system call, based on the file management policy;
   wherein the method for managing files is performed on the Microsoft Windows OS,
   wherein the process of (ill) is performed by the processor as a first device driver inserted between a file manager and a storage device driver of the OS, the file manager and the storage device driver being included in a device stack, and wherein the process of (II2) is performed by the processor as a second device driver inserted between a network manager and a communication device driver of the OS, the network manager and the communication device driver being included in the device stack.

\* \* \* \* \*